United States Patent
Lo Sasso et al.

[15] 3,642,619
[45] Feb. 15, 1972

[54] CONDITIONING SEWAGE WASTE SLUDGES FOR DEWATERING

[72] Inventors: Ronald Alfred Lo Sasso; Emerson G. Rausch, both of Coraopolis, Pa.

[73] Assignee: Calgon Corporation, Pittsburgh, Pa.

[22] Filed: Aug. 31, 1970

[21] Appl. No.: 68,545

[52] U.S. Cl. ................................................210/52, 210/10
[51] Int. Cl. ............................................................C02c 3/00
[58] Field of Search ......................................210/10, 51–54

[56] References Cited

UNITED STATES PATENTS 3,171,804  3/1965  Rice ..................................210/54 X

FOREIGN PATENTS OR APPLICATIONS 607,440  10/1960  Canada.....................................210/53
805,526  12/1958  Great Britain............................210/52

OTHER PUBLICATIONS

Bargman, R. D. et al., Sludge Filtration and the use of Synthetic Organic Coagulants at Hyperion, Sewage and Industrial Wastes, Vol. 30, Sept. 1958, pp. 1079-1100

Primary Examiner—Michael Rogers
Attorney—William L. Krayer and Herbert J. Zeh, Jr.

[57] ABSTRACT

Waste sludges are conditioned for dewatering by intermixing with the waste sludge prior to dewatering an admixture of a water-soluble high-molecular weight nonionic polyacrylamide and a water-soluble salt containing ferric ions.

6 Claims, No Drawings

CONDITIONING SEWAGE WASTE SLUDGES FOR DEWATERING

BACKGROUND OF THE INVENTION

This invention relates to the treatment of waste. More particularly, this invention is directed to a process for conditioning sludges from municipal and industrial wastes to obtain an improved dewatering step.

Sludge is the major byproduct of industrial and domestic water and waste treating processes. In fact, one of the major problems in a well-run water pollution control program is the sludge conditioning method used in dewatering sludges. The term "sludge dewatering process" as used in the art and as used herein means any process which reduces the water content of the sludge from its usual value of 93 to 99 percent by weight to about 90 percent by weight or less. That is, it concentrates the sludge solids to about 10 percent by weight or greater.

Waste water sludge is basically characterized according to three factors which are (1) sludge source, (2) sludge processing, and (3) degree of treatment. By "sludge source" is meant whether the sludge is from municipal (domestic) waste water or industrial waste water or a combination thereof. The sludge processing characteristic defines whether the sludge is raw untreated sludge, anaerobic or aerobic digested sludge, air flotation sludge or digested elutriated sludge. The degree of treatment indicates whether the sludge is primary sludge, activated sludge, waste activated sludge, chemically precipitated sludge, trickling filter humus or a combination of one or more of these such as waste activated sludge combined with primary sludge. It is generally accepted that each individual sludge has a different characterization and this sludge character more or less dictates the dewatering process used.

The various mechanical dewatering processes now commonly used in the art and as used herein are gravity filtration, vacuum filtration, centrifugation, flotation, and sedimentation. However, regardless of the mechanical process used for dewatering, it has become standard practice in the art to chemically condition the sludge prior to dewatering. This chemical conditioning of the sludge enhances the mechanical dewatering process dramatically. The water content of the sludge can be reduced from concentrations in the neighborhood of 93 to 99 percent water to those of about 60 to 90 percent or less by proper chemical conditioning prior to mechanical dewatering.

The most frequently employed chemical for the conditioning of sludge for dewatering is ferric chloride. The ferric chloride may be used alone or in combination with lime and/or other conditioning agents. Other ferric salts such as ferric sulfate have been widely used alone and in combination with lime. Some ferrous salts, notably ferrous sulfate, have also found use in the chemical conditioning of sludges.

More recently, high-molecular weight polyelectrolytes have been extensively used for chemically conditioning sludges. The polyelectrolytes have been used alone and in combination with inorganic chemical conditioning agents such as the ferric and ferrous salts, alum and lime. In most of the combination treatments of the prior art, the sludge is first treated with the inorganic conditioning agent followed by the polyelectrolyte. A few applications use the polyelectrolyte first followed by the inorganic conditioning agent. For some examples of the prior art methods, see Priesing et al., U.S. Pat. No. 3,300,407, which is directed to a chemical conditioning process using an anionic polyelectrolyte followed by an inorganic conditioning agent. See also Blaisdell et al., U.S. Pat No. 3,142,638 and 3,423,312, which are directed to the chemical conditioning of sewage sludges. In addition, Lee's U.S. Pat. No. 3,472,767 is directed to the conditioning of sewage sludges with a combination of a cationic polyelectrolyte and an acid salt containing polyvalent metal ions. Finally, see Hronas, U.S. Pat. No. 3,066,095.

SUMMARY OF THE INVENTION

We have found that the dewatering of waste sludges is greatly enhanced if the sludge is treated prior to dewatering with an admixture of a water-soluble high-molecular weight nonionic polyacrylamide and a water-soluble salt containing ferric ions. The waste sludge treated according to our invention dewaters better than sludge treated using prior art methods. Chemical conditioning with an admixture of the polymer and ferric-containing salt yields a sludge which dewaters better than a sludge treated with the ferric-containing salt alone or the polymer alone. It is also better than a sludge treated with the polymer followed by the ferric salt or the ferric salt followed by the polymer. We have found that the use of the admixture gives an unexpected synergistic result compared to the other methods of addition.

Our method of conditioning the sludges comprises adding to the sludge prior to dewatering from 300 to 3,000 p.p.m. of an admixture of the polymer/ferric salt. The admixture is comprised of from 0.05 percent by weight to about 5.0 percent by weight of the polymer and the remainder is the ferric-containing salt.

It is a critical step in the method of our invention that the ferric salt and polymer are physically blended into a liquid admixture before they are added to the sludge. This physical blending may be accomplished by forming a dry admixture of the two components which is dissolved prior to using to form a solution having the desired amounts of polymer and iron. The physical blend may also be a concentrated aqueous solution of a polymer/ferric salt admixture which is simply diluted to the desired solution strength before using. One may also prepare a solution of the polymer and a solution of the ferric salt and mix these two solutions together in the desired ratio before adding them to the sludge. There are also other ways of preparing and using the physical blend of the polymer/ferric-containing salt which are apparent to the skilled artisan. The important factor is that the polymer and ferric-containing salt are physically blended into an aqueous solution in the desired ratio before addition to the sludge.

As mentioned supra, the polymer of our invention is a water-soluble high-molecular weight nonionic polyacrylamide. To date, however, it is extremely difficult to prepare a high-molecular weight polyacrylamide that does not contain even a low percentage of carboxylic groups. Therefore, by a "nonionic polyacrylamide," we mean to include polyacrylamides that contain a small amount of carboxylic groups. We prefer a completely nonionic polyacrylamide but our invention is functional with polyacrylamides containing 2 or 3 percent carboxylic groups. In addition, the polyacrylamide of our invention does not have to be a homopolymer of acrylamide. The term polyacrylamide as used herein therefore includes copolymers of acrylamide and up to about 25 percent of other nonionic comonomers. Some of the nonionic comonomers are diacetone acrylamide, hydroxy ethyl acrylate, hydroxy ethyl methacrylate, polyethyleneoxide, n-butyl acrylamide and methacrylamide. It is also within the scope of this invention to use polyacrylamides containing up to about 5 percent of a cationic comonomer. Some useful cationic comonomers are the dialkyl diallyl ammonium chlorides and 2-hydroxy 3 methacryloxypropyl trimethyl ammonium chloride. The term "nonionic polyacrylamide" includes copolymers of acrylamide and up to about 5 percent by weight of a cationic comonomer. While higher levels of cationic comonomers are compatible with the ferric-containing salts, we prefer to use a nonionic polymer. The preferred comonomer is diacetone acrylamide. In fact, we have found that copolymers containing as much as 50 percent by weight diacetone acrylamide work very well in our invention. We therefore include in the definition of polyacrylamide as used herein polymers containing up to 50 percent by weight diacetone acrylamide.

There is no limitation on the molecular weight of a polymer which will work in our invention. A low-molecular weight polymer is effective in so far as it conditions the sludge to a certain degree. However, as compared to a high-molecular weight polymer, the low-molecular weight polymer is ineffective. Generally speaking, the higher the molecular weight the polymer, the more effective it is in our invention. Therefore, by "high-molecular weight polymer," we mean a polymer with a molecular weight of one million or greater. We prefer molecular weights of 10 to 20 million or higher.

The ferric conditioning agent of our invention is water-soluble ferric-containing salt. We have found that any water-soluble salt which yields ferric ions in solution will work in our invention. Some of the useful ferric salts are ferric nitrate, ferric sulfate, ferric chloride, ferric oxalate, ferric ammonium oxalate, ferric formate, ferric lactate, and ferric bromide. However, we have found that ferric chloride and ferric sulfate are preferred. Among the preferred compounds, ferric chloride is the more preferred.

It is also within the scope of our invention to treat the sludge with lime in addition to the polymer/ferric salt admixture. As realized by one skilled in the art, it is often necessary for effective sludge conditioning to add lime to the sludge and make the sludge alkaline. Therefore, it is within the scope of this invention to treat the sludge with lime either before or after treating the sludge with the polymer/ferric salt admixture. Preferably, the lime treatment precedes the polymer/ferric salt admixture treatment.

We have demonstrated that the method of our invention is a very effective sludge conditioning process for dewatering. A series of Buchner Funnel Tests were run on various samples of sludges obtained from different mideastern municipal water treatment plants. The sludges were a combination of domestic and industrial wastes. The Buchner Funnel Test uses a Buchner Funnel for holding the sludge, a vacuum pump for drawing the moisture out of the sludge, and a graduated buret for measuring the filtration rate. The test is run using the following general procedure. First, a filter paper or filter cloth is placed in the Buchner Funnel which is connected to the measuring buret. Then 200 milliliters of the aqueous sludge suspension is measured into a 400 milliliter beaker. The sludge is then conditioned by adding the conditioning agent and mixing thoroughly. If two or more conditioning agents are being applied to the sludge, a thorough mixing is done after each addition. The conditioned sludge is poured into the previously prepared funnel and a vacuum applied. The time to draw 75, 125, and 150 milliliters of filtrate from the sludge is recorded. In addition, the total corrected volume of filtrate (milliliters of filtrate minus milliliters of chemical added) recovered after 2 minutes of vacuum is recorded. After 2 minutes of vacuum, the test is stopped and the dryness of cake recorded. The following tables illustrate the results of some Buchner Funnel Tests.

Table 1 clearly illustrates the unexpected synergistic effects of our invention. The use of the admixture in accordance with our invention conditions the sludge for dewatering better than the use of the polymer followed by the ferric chloride or the ferric chloride followed by the polymer. Table 2 below illustrates the effectiveness of the use of the admixture of our invention. Table 3 shows the effectiveness of the use of the ferric chloride followed by the polymer and the polymer followed by the ferric chloride. A comparison of Tables 2 and 3 once again shows the unexpected greater effectiveness of our invention.

TABLE I

| Ex. | Type of treatment | P.p.m. FeCl₃ solution | P.p.m. polymer | Ml. of filtrate after 2 min. | Conc. in percent by wt. of dewatered sludge | Percent change in sludge conc. |
|---|---|---|---|---|---|---|
| 1 | Admixture | 1,500 | 22.5 | 180 | 20 | 1,000 |
| 2 | FeCl₃ first—polymer last | 1,500 | 22.5 | 118 | 4.8 | 244 |
| 3 | Polymer first—FeCl₃ last | 1,500 | 22.5 | 133 | 5.97 | 298 |
| 4 | Admixture | 1,500 | 15 | 179 | 19 | 950 |
| 5 | FeCl₃ first—polymer last | 1,500 | 15 | 128.4 | 5.58 | 279 |
| 6 | Polymer first—FeCl₃ last | 1,500 | 15 | 134.4 | 6.1 | 305 |
| 7 | Admixture | 1,500 | 11.25 | 176 | 16.66 | 833 |
| 8 | FeCl₃ first—polymer last | 1,500 | 11.25 | 126.6 | 5.43 | 271 |
| 9 | Polymer first—FeCl₃ last | 1,500 | 11.25 | 129.6 | 5.66 | 283 |
| 10 | Admixture | 1,500 | 1.5 | 192 | 50 | 2,500 |
| 11 | FeCl₃ first—polymer last | 1,500 | 1.5 | 109.9 | 4.4 | 222 |
| 12 | Polymer first—FeCl₃ last | 1,500 | 1.5 | 111.9 | 4.5 | 227 |
| 13 | Admixture | 1,750 | 8.75 | 187.5 | 32 | 1,600 |
| 14 | FeCl₃ first—polymer last | 1,750 | 8.75 | 134.2 | 6.1 | 305 |
| 15 | Polymer first—FeCl₃ last | 1,750 | 8.75 | 141.2 | 6.8 | 340 |
| 16 | Admixture | 1,750 | 4.375 | 185.5 | 27.6 | 1,380 |
| 17 | FeCl₃ first—polymer last | 1,750 | 4.375 | 131.3 | 5.8 | 299 |
| 18 | Polymer first—FeCl₃ last | 1,750 | 4.375 | 141.3 | 6.8 | 340 |

TABLE 2

| Ex. | Admixture composition P.p.m. FeCl₃ | Admixture composition P.p.m. polymer | Time in seconds to obtain 75 ml. filtrate | Time in seconds to obtain 125 ml. filtrate | Time in seconds to obtain 150 ml. filtrate | Total filtrate removed after 2 min. | Conc. in percent by wt. dewatered sludge | Comments on sludge cake |
|---|---|---|---|---|---|---|---|---|
| 19 | 1,750 | 26.25 | 27 | 67 | 94 | 169 | 13 | Moist. |
| 20 | 1,500 | 22.5 | 18 | 48 | 70 | 183 | 23.5 | Dry/moist. |
| 21 | 1,250 | 18.75 | 25 | 68 | 100 | 163 | 10.8 | Wet/moist. |
| 22 | 1,750 | 17.5 | 24 | 63 | 87 | 173 | 14.8 | Moist. |
| 23 | 1,500 | 15.0 | 20 | 52 | 73 | 182 | 22.2 | Dry/moist. |
| 24 | 1,500 | 11.3 | 20 | 55 | 78 | 179 | 19 | Moist. |
| 25 | 1,750 | 8.75 | 17 | 42 | 57 | 191 | 44.4 | Dry. |
| 26 | 1,500 | 7.5 | 17 | 45 | 62 | 189 | 36.4 | Dry. |
| 27 | 2,000 | 10.0 | 22 | 57 | 70 | 183 | 23.5 | Dry/moist. |
| 28 | 1,750 | 4.375 | 17 | 44 | 60 | 189 | 36.4 | Dry. |
| 29 | 1,500 | 3.75 | 20 | 50 | 71 | 187 | 30.8 | Dry. |
| 30 | 2,000 | 5.0 | 21 | 53 | 75 | 185 | 26.7 | Dry. |
| 31 | 1,750 | 1.75 | 17 | 46 | 64 | 192 | 50 | Dry. |
| 32 | 2,000 | 2.0 | 18 | 48 | 68 | 190 | 40 | Dry. |
| 33 | 1,500 | 1.5 | 18 | 45 | 64 | 195 | 50 | Dry. |
| 34 | 1,250 | 1.25 | 16 | 41 | 56 | 194 | 66.6 | Dry. |

TABLE 3

| Ex. | Treatment | P.p.m. FeCl₃ solution | P.p.m. polymer | Ml. of filtrate after 2 min. | Concentration in percent by weight dewatered sludge |
|---|---|---|---|---|---|
| 35 | FeCl₃ first | 1,500 | 22.5 | 122 | 5.13 |
| 36 | Polymer first | 1,500 | 22.5 | 137 | 6.35 |
| 37 | FeCl₃ first | 1,500 | 15 | 132 | 5.9 |
| 38 | Polymer first | 1,500 | 15 | 138 | 6.45 |
| 39 | FeCl₃ first | 1,500 | 11.3 | 130 | 5.7 |
| 40 | Polymer first | 1,500 | 11.3 | 133 | 6.8 |
| 41 | FeCl₃ first | 1,700 | 8.7 | 138 | 6.45 |
| 42 | Polymer first | 1,750 | 8.7 | 145 | 7.27 |
| 43 | FeCl₃ first | 1,750 | 4.4 | 135 | 6.15 |
| 44 | Polymer first | 1,750 | 4.4 | 145 | 7.27 |
| 45 | FeCl₃ first | 1,500 | 1.5 | 113 | 4.6 |
| 46 | Polymer first | 1,500 | 1.5 | 115 | 4.7 |

TABLE 4

| Ex. | Treatment | P.p.m. FeCl₃ solution | P.p.m. polymer | Ml. of filtrate after 2 min. | Concentration in percent by weight dewatered sludge |
|---|---|---|---|---|---|
| 47 | FeCl₃ alone | 1,750 | | 144 | 7.1 |
| 48 | do | 2,000 | | 165 | 11.4 |
| 49 | do | 2,500 | | 170 | 13.3 |
| 50 | do | 3,000 | | 175 | 16 |
| 51 | do | 3,250 | | 173 | 14.8 |
| 52 | do | 2,750 | | 172 | 14.3 |
| 53 | Admixture | 2,250 | 33.75 | 173 | 14.8 |
| 54 | do | 2,500 | 37.5 | 145 | 7.3 |
| 55 | do | 2,000 | 30.0 | 175 | 16 |
| 56 | do | 1,750 | 26.25 | 165 | 11.4 |
| 57 | do | 2,000 | 20 | 170 | 13.3 |
| 58 | do | 2,250 | 22.5 | 173 | 14.8 |
| 59 | do | 1,750 | 17.50 | 167 | 12.1 |
| 60 | do | 2,000 | 15 | 154 | 8.7 |
| 61 | do | 2,250 | 16.87 | 150 | 10 |
| 62 | do | 2,500 | 18.75 | 172 | 14.3 |
| 63 | do | 2,750 | 20.62 | 169 | 12.9 |
| 64 | do | 2,500 | 12.5 | 165 | 11.4 |
| 65 | do | 2,750 | 13.75 | 164 | 11.1 |
| 66 | do | 2,250 | 11.25 | 173 | 14.8 |
| 67 | do | 2,000 | 10.0 | 175 | 16 |
| 68 | do | 1,750 | 8.75 | 165 | 11.4 |
| 69 | do | 2,000 | 5.0 | 155 | 8.9 |
| 70 | do | 2,500 | 6.25 | 165 | 11.4 |
| 71 | do | 2,250 | 5.62 | 158 | 9.5 |
| 72 | do | 2,750 | 6.87 | 175 | 16 |
| 73 | do | 2,500 | 2.5 | 175 | 16 |
| 74 | do | 2,750 | 2.75 | 163 | 10.8 |
| 75 | do | 2,250 | 2.25 | 170 | 13.3 |
| 76 | Polymer alone | | 2.5 | 48 | 2.6 |
| 77 | do | | 6.9 | 45 | 2.6 |
| 78 | do | | 10.0 | 46 | 2.6 |
| 79 | do | | 18.8 | 43 | 2.5 |
| 80 | do | | 22.5 | 46 | 2.6 |
| 81 | do | | 30 | 42 | 2.5 |

The results in Table 4 again illustrate that the admixture method of our invention is an improvement over the prior art. Using the admixture conditioning method the sludge can be effectively dewatered at lower dosages of chemical conditioning agent.

In the above tables all p.p.m. were parts per million on a weight basis and all concentrations were in weight percents. The polymer was a water-soluble high-molecular weight nonionic homopolymer of acrylamide. The ferric chloride solution was 44.62 percent by weight ferric chloride and the sludge had an initial concentration of about 2 percent by weight.

We claim:
1. An improved process for dewatering an aqueous waste sludge comprising:
   a. first forming an aqueous blend of a water-soluble, high-molecular weight polymer consisting essentially of nonionic polyacrylamide containing not more than about 3 percent carboxyl groups and an inorganic water-soluble salt-containing ferric ions;
   b. thereafter conditioning the waste sludge with the liquid blend; and
   c. subjecting the conditioned sludge to a mechanical dewatering step.
2. A process as in claim 1 wherein the blend, exclusive of water, consists essentially of from 0.05 percent to about 5.0 percent by weight of the polymer and the remainder is the water-soluble salt-containing ferric ions.
3. A process as in claim 1 wherein the blend is used in concentrations of from 300 to 3,000 p.p.m. by weight based on the total weight of the aqueous sludge suspension.
4. A process as in claim 1 wherein the water-soluble salt-containing ferric ions is ferric chloride.
5. A process as in claim 1 wherein the polymer is a homopolymer of acrylamide.
6. An improved process for dewatering an aqueous waste sludge comprising:
   a. first forming an aqueous blend of water-soluble, high-molecular weight polymer consisting essentially of nonionic polyacrylamide containing not more than about 3 percent carboxyl groups and an inorganic water-soluble salt-containing ferric ions where the blend, exclusive of water, consists essentially of from 0.05 percent to about 5.0 percent by weight of the polymer and the remainder the water-soluble salt-containing ferric ions;
   b. thereafter conditioning the waste sludge with from 300 to 3,000 p.p.m. by weight of the liquid blend; and
   c. subjecting the conditioned sludge to a mechanical dewatering step.

* * * * *

UNITED STATES PATENT OFFICE
CERTIFICATE OF CORRECTION

Patent No. 3,642,619  Dated February 15, 1972

Inventor(s) Ronald Alfred Lo Sasso et al

It is certified that error appears in the above-identified patent and that said Letters Patent are hereby corrected as shown below:

Column 3, line 8, -- a -- should be inserted before "water-solu-". Columns 3 and 4, Table 1, under heading "Percent change in Sludge conc.", next to last number in this column "299" should read -- 290 --. Column 5, Table 4, line 35, under heading "Ml. of filtrate after 2 min." the 15th number "150" should read -- 160 --. Column 6, line 37, insert -- a -- before "water-soluble".

Signed and sealed this 7th day of November 1972.

(SEAL)
Attest:

EDWARD M. FLETCHER, JR.  ROBERT GOTTSCHALK
Attesting Officer  Commissioner of Patents